United States Patent [19]
Jeffers

[11] 4,161,273
[45] Jul. 17, 1979

[54] TUBE JOINT AND METHOD OF MAKING SAME

[75] Inventor: Robert P. Jeffers, Kinsman, Ohio

[73] Assignee: Youngstown Sheet and Tube Company, Youngstown, Ohio

[21] Appl. No.: 770,679

[22] Filed: Feb. 22, 1977

[51] Int. Cl.² .............................................. B23K 1/18
[52] U.S. Cl. ................................. 228/154; 228/172; 228/173 F; 29/157 R; 285/399; 285/286
[58] Field of Search ............... 285/399, 382, 382.1, 285/382.2, 382.4, 382.5, 382.7, 55, 286; 228/154, 172, 173 F, 170; 72/367, 370, 113, 340, 335; 29/282, 283.5, 525, 515, 517

[56] References Cited
U.S. PATENT DOCUMENTS

| 1,299,371 | 4/1919 | Meloon | 285/382.4 X |
|---|---|---|---|
| 1,610,165 | 12/1926 | Schellin | 285/382.4 X |
| 2,037,962 | 4/1936 | Brown | 285/399 X |
| 2,142,149 | 1/1939 | Replogle | 285/399 X |
| 2,679,681 | 1/1954 | Resler | 285/382.4 X |
| 2,910,983 | 11/1959 | Everett | 285/382.2 UX |
| 3,466,738 | 9/1969 | Mount | 285/382.4 X |
| 3,872,707 | 3/1975 | Broske | 285/382.2 X |

FOREIGN PATENT DOCUMENTS 667143  2/1952  United Kingdom ..................... 228/154

Primary Examiner—George H. Krizmanich
Attorney, Agent, or Firm—James B. Blanchard; Peter E. Heuser

[57] ABSTRACT

A tube joint including a male end which has a rounded inner edge having its original surface finish and a female end which is expanded to receive the male end. The male end is formed by chamfering the end outer diameter and flaring the end inner diameter until the end inner diameter is substantially rounded. The female end is expanded so its inner diameter is only slightly greater than the outer diameter of the male end.

3 Claims, 5 Drawing Figures

TUBE JOINT AND METHOD OF MAKING SAME

BACKGROUND OF THE INVENTION

This invention relates to conduit joints. More particularly the invention relates to an improved slip joint and method of making same.

There are many types of tube joints which are in common use in tube systems. One of the most common, referred to as a slip joint, is made by slipping the straight male end of one piece of tubing into the expanded female end of another. It is ordinarily desirable to avoid sharp edges along the inner surfaces of such tubing since such edges disrupt fluid flow or, where such tubing is used to pneumatically transport capsules, the edges tend to scrape and/or tear at the capsules passing thereby. To avoid sharp edges in conventional slip joints, the inside of the male end is deburred and chamferred with a hand file, a very time consuming and expensive operation. It is also difficult to control the quality of a handmade joint such as this. Alternatively, a reamer may be used to chamfer the inner edge but such practice requires subsequent hand filing to remove burrs and therefore is of little advantage over hand chamfering.

Another type of joint in common use is a butt joint, usually with some sort of sleeve slipped over the outside. Here it is necessary to deburr both ends, with the attendant disadvantages discussed above. Another disadvantage of a butt joint is that if one of the tubes is oval in a direction not coincided with the ovality of the other, it can be very difficult to obtain a good, smooth joint. Such ovality is common where tubing is cut.

Yet another disadvantage attendant with both of the above joints is that in deburring or chamfering the inner surface of the tubing the galvanized finish is removed, thus leaving the conduit susceptible to corrosion which causes joint roughness, and eventually leakage.

SUMMARY OF THE INVENTION

This invention responds to the problems presented in the prior art by providing a tube joint and method of making same which eliminates sharp inner edges yet provides a circular cross section without removing the galvanized surface on the inner wall of the tubing. This joint is formed by flaring the male end and cutting the outer end edge of the male end so that after the male end is flared, the end inner diameter is substantially rounded. The flaring step may be performed either before or after the cutting of the outer end edge.

The novel features which are believed to be characteristic of the invention are set forth in the appended claims. It is believed the invention will be best understood by reference to the following description taken in connection with the accompanying drawings.

DETAILED DESCRIPTION OF THE PREFERRED EMBODIMENTS

Figure 1:
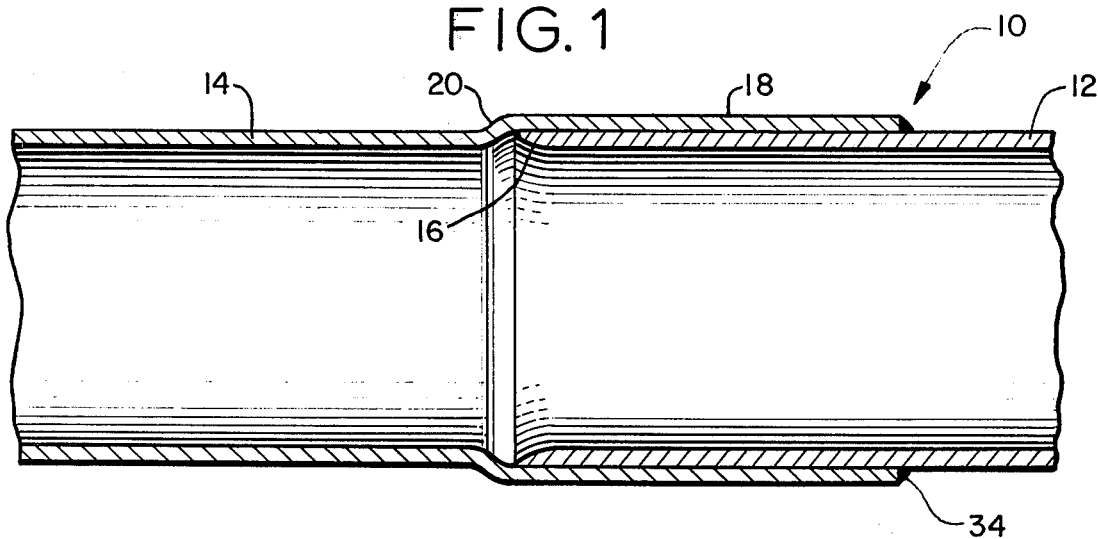
FIG. 1 is a partial sectional view of a completed joint constructed in accordance with the present invention.

In that form of the invention chosen for the purposes of illustration the joint is shown generally at 10 in FIG. 1. The joint 10 is comprised of a male end 12 and a female end 14. The male end 12 has a rounded inner edge 16 with its original surface finish intact. The cross-section of this inner edge typically forms an arc having approximately a 5/16" radius. Of course, this arc would not be in the form of a perfect circle section. In fact, the term "rounded" as used herein is intended to include an edge which is oblique or beveled. It is only necessary that the edge not be square, thus avoiding the sharp corner attendant with such a configuration. The term "original surface finish" as used herein ordinarily refers to a galvanized finish. However, tubing with any number of other finishes may also be used with the present invention and would obtain the advantages discussed herein.

The female end 14 of the joint 10 has an expanded portion 18 adjacent its end, with the expansion step designated at 20. With the joint 10 assembled the inner surface of this step 20 is in the vicinity of the end of the male end 12, thus providing two rounded surfaces at the point of abuttment.

FIGS. 2 through 5 depict the formation of the male end 12 of the joint 10. The tube ends from which the male and female parts of the joint are to be formed are normally squared off. As indicated above, this configuration is unsuitable for the male end. Moreover, such tube ends are often out-of-round, thus hindering the formation of close fitting joints.

In one embodiment of the present invention the first step in forming the male end 12 is to chamfer the edge outer diameter. This is ordinarily done by mounting the tube on a lathe and chamfering the outer edge with a chamfering tool. At the same time it is desirable that the end be faced and the inner diameter be deburred. This can be done with one or two additional tools or the entire facing and chamfering operation can be performed with one composite tool. At any rate, the deburring tool should not contact the tubing much beyond the inner end edge since it is a primary object of the present invention to retain the inner surface finish intact. Depending upon the cleanliness of the end cut, deburring and facing may not be necessary. Deburring is advantageous where the end-cut is rough. Facing minimizes handling hazards. Moreover, it has been found in most applications that a sharp edge is more susceptable to corrosion than a blunted face.

With longer tubing it may be easier to use rotatable facing heads rather than a lathe to chamfer, face and debur the male end. As with lathe facing, it is preferable that this be done in a single operation.

Figure 2:
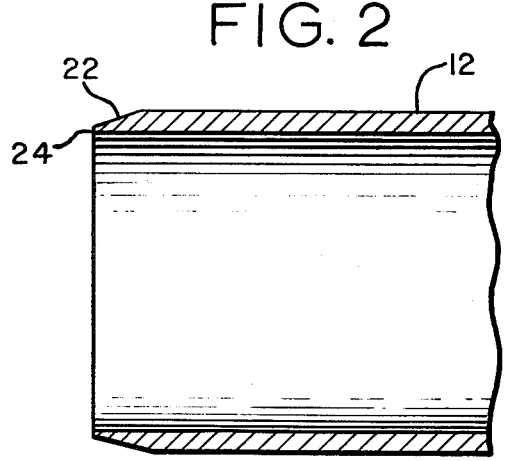
FIG. 2 is a sectional view of the male tube subsequent to outside chamfering but prior to flaring.

A chamfered and faced male end is depicted in FIG. 2, with the chamfered portion indicated at 22 and the face at 24. The chamfer 22 is ordinarily in the neighborhood of a 20° cut although it may be more or less depending upon the thickness and rigidity of the tubing. By way of example, using typical four-inch galvanized tubing, a 20° chamfer should be taken until the end face thickness is approximately 0.02". This results in a chamfer width of approximately 0.1".

After the male end is chamfered, the inner diameter of the end is flared until the end outer diameter is substantially equivalent to the outer diameter of the remainder of the male tube. This operation may be performed by means of the flaring tool 26 depicted in FIG. 3. This tool includes a frusto-conical flaring mandrel 28 having an angle of flare substantially equal to the chamfer angle, ordinarily 20°. This tool also has a confining sleeve 30 which fits around the mandrel 28 and the male tube end 12. The inner diameter of the sleeve 30 should be substantially the same as, or perhaps slightly greater than, the outer diameter of the male tube end 12. Thus, prior to insertion of the mandrel 38, the confining sleeve 30 can be driven on to the male end 12. Alternatively, the sleeve may actually be a part of the mandrel 28.

Figure 4:
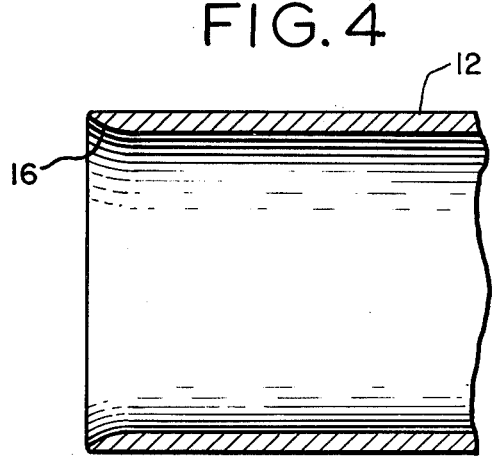
FIG. 4 is a sectional view of a completed male tube end constructed in accordance with one embodiment of the invention.
Figure 3:
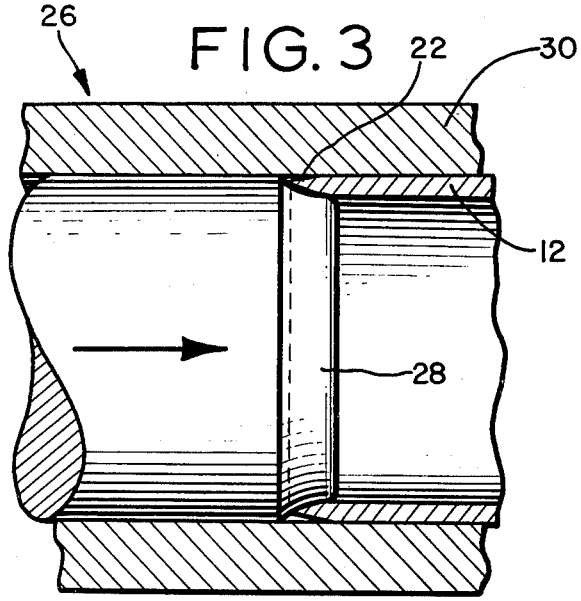
FIG. 3 is a partial sectional view of the male tube subsequent to chamfering, as it is being flared.
Figure 5:
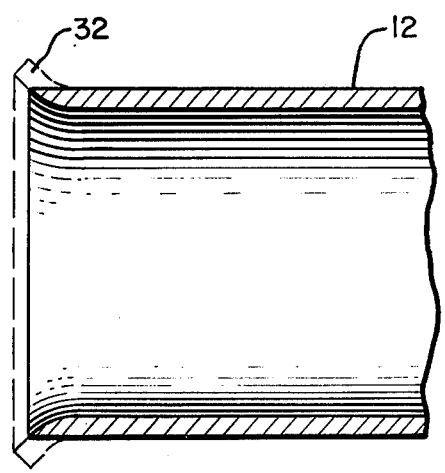
FIG. 5 is a sectional view of a completed male tube end constructed in accordance with another embodiment of the invention, with the flared tube end shown in phantom.

To form the rounded edge, the mandrel 28 is impressed into the male end 12, in coaxial alignment thereto, thus forcing the male end tip outward, until the chamfered portion 22 conforms to the inner diameter of the confining sleeve 30. FIG. 3 depicts the male end approximately halfway between its chamfered initial and final configuration. The confining sleeve 30 is then driven off of the male end 12 and formation is completed, as depicted in FIG. 4. It should also be noted that the flaring operation has the additional advantage of formation of a perfect circular cross-section, thus insuring a close fit between the male and female ends.

In a second embodiment of the present invention the male end 12 is first flared and then the flared portion is removed. A flared male end is shown at 32 in phantom in FIG. 5. Flaring is performed by a conventional conical flaring tool which is turned down into the center of the tube end. In determining the degree of flare, the operator would consider the thickness as well as the malleability of the tubing. The flare is ordinarily within the range of 10 to 30 degrees although substantially greater flare would be possible with thin tubing. Typical four-inch galvanized tubing is ordinarily flared 15 to 25 degrees. This flaring operation has the added advantage of insuring a perfect circular cross-section in the tubing, a feature which may be absent with a conventional turned inside chamfer.

After the flaring operation of this embodiment, the flared portion 32 is removed from the outer surface of the male end 12. Since the rounded inner edge surface is to be retained, this removal operation would only remove that part of the flared portion which extends radially outward beyond the original outer diameter of the tubing, indicated in phantom in FIG. 5. The flared portion is ordinarily removed by either lathe cutting or grinding the tubing.

Subsequent to the removal of the flared portion 32, the male end 12 may be faced for handling protection. This facing would be minimal so to retain the integrity of the tube surface finish.

The female end 14 is expanded by conventional methods to receive the male end 12. A clamp block (not shown) having a contour covering the bottom 180 degrees is ordinarily utilized. This block has two portions, defining cylinders of two different diameters, with a step therebetween. The tube end which is to be the female end 14 is placed into the block a second block of identical configuration is locked onto the upper half of the tubing. A cylinder which conforms to the desired inner diameter of the expanded portion of the female tube is driven into the end of the tubing, causing it to expand and thus conform to the blocks.

After the male 12 and female 14 ends of the joint have been formed the male end is inserted coaxially into the female end until the male end face 24 abutts or nearly abutts the female step 20. With the joint assembled, the female end may be brazed, soldered, welded, or otherwise secured to the male end as shown at 34 in FIG. 1.

Of course, it should be understood that various changes and modifications in the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

What is claimed is:

1. The method of forming a tube joint comprising:
   chamfering the end outer diameter of a male tube and then flaring the end inner diameter of said male tube until the end outer diameter is substantially equivalent to the outer diameter of the remainder of said male tube;
   expanding one end of a second tube to receive said male end, thus forming a female end; and
   connecting said male and female ends.

2. The method of making a tube joint including a male and female end comprising:
   flaring said male end;
   removing the flared portion from the outer surface of said male end so that said male end outer surface has substantially the same outer diameter as the remainder of the tube;
   expanding said female end to receive said male end; and
   connecting said male and female ends.

3. A method of making the male end of a tube joint comprising:
   flaring the end of a tube; and
   removing the flared portion from the outer surface of a said tube end so that the outer surface of said tube end has substantially the same outer diameter as the remainder of the tube.

* * * * *